(12) United States Patent
Brath et al.

(10) Patent No.: US 9,062,656 B2
(45) Date of Patent: Jun. 23, 2015

(54) PITCH CONTROL OF A WIND TURBINE

(75) Inventors: Per Brath, Randers Nv (DK); Kasper Zinck Ostergaard, Flemming (DK)

(73) Assignee: Vestas Wind Systems A/S, Randers SV (DK)

( * ) Notice: Subject to any disclaimer, the term of this patent is extended or adjusted under 35 U.S.C. 154(b) by 985 days.

(21) Appl. No.: 13/139,980

(22) PCT Filed: Dec. 10, 2009

(86) PCT No.: PCT/DK2009/050328
§ 371 (c)(1),
(2), (4) Date: Aug. 30, 2011

(87) PCT Pub. No.: WO2010/069323
PCT Pub. Date: Jun. 24, 2010

(65) Prior Publication Data
US 2011/0305568 A1 Dec. 15, 2011

Related U.S. Application Data

(60) Provisional application No. 61/201,863, filed on Dec. 15, 2008.

(30) Foreign Application Priority Data

Dec. 15, 2008 (DK) .......................... PA 2008 01779

(51) Int. Cl.
*F03D 7/04* (2006.01)
*F03D 7/02* (2006.01)

(52) U.S. Cl.
CPC .............. *F03D 7/046* (2013.01); *F03D 7/0224* (2013.01); *F03D 7/0276* (2013.01); *F05B 2270/109* (2013.01); *F05B 2270/304* (2013.01); *F05B 2270/32* (2013.01); *F05B 2270/327* (2013.01); *F05B 2270/328* (2013.01); *F05B 2270/335* (2013.01); *F05B 2270/404* (2013.01); *Y02E 10/723* (2013.01)

(58) Field of Classification Search
CPC ..... F03D 7/0224; F03D 7/0276; F03D 7/046; Y02E 10/723; F05B 2270/109; F05B 2270/304; F05B 2270/327; F05B 2270/328; F05B 2270/335; F05B 2270/404; F05B 2270/32
See application file for complete search history.

(56) References Cited

U.S. PATENT DOCUMENTS

| 4,161,658 A | 7/1979 | Patrick |
| 4,297,076 A | 10/1981 | Donham et al. |
| 2003/0151259 A1 * | 8/2003 | Feddersen et al. ............. 290/44 |

OTHER PUBLICATIONS

Denmark Office Action of Patent Application No. PA 2008 01779 dated Jun. 26, 2009.
International Search Report for Patent Application No. PCT/DK2009/050328 dated Sep. 12, 2010.

(Continued)

*Primary Examiner* — Nathaniel Wiehe
*Assistant Examiner* — Jeffrey A Brownson
(74) *Attorney, Agent, or Firm* — Patterson & Sheridan, LLP

(57) ABSTRACT

A wind turbine control system suitable for minimizing actuation of pitch actuators is disclosed. The control system uses an error gain schedule in full load control for reducing pitch actuation when the difference between the rotor speed and the reference rotor speed is not critical for the load of wind turbine components. The error gain schedule may be a non-linear function which reduces the gain for low rotor speed errors. The use of the error gain schedule may reduce wear of the pitch actuators and may improve reduction of structural oscillations since focus removed from tracking the rotor speed reference when the speed error is low.

19 Claims, 8 Drawing Sheets

(56) References Cited

OTHER PUBLICATIONS

Bossanyi, E. A., "The Design of Closed Loop Controllers for Wind Turbines," Wind Energy, vol. 3, No. 3, Jan. 1, 2000, pp. 149-163, John Wiley & Sons, Ltd.

Yulong, Wang, "Analysis on control Method VSCF Wind Power System," Multimedia and Information Technology, 2008, MMIT, International Conference, Dec. 30, 2008, pp. 677-680, IEEE, Piscataway, NJ.

* cited by examiner

PITCH CONTROL OF A WIND TURBINE

FIELD OF THE INVENTION

The invention relates to control of wind turbines and in particular to control of pitch of wind turbine blades.

BACKGROUND OF THE INVENTION

Pitch actuators are used to adjust the pitch or angle of rotor blades in order to adjust aerodynamic efficiency and, for example the rotor speed, of the wind turbine rotor.

Thus, by adjusting the pitch it is possible to reduce the rotor speed and, thereby, avoid too high loads of components of the wind turbine for example at high wind speeds. However, actuation of the pitch actuator, which is often a hydraulic actuator, naturally reduces life time of the pitch actuator and, thereby, increases the risk for failures. Operational reliability of a wind turbine is of most importance in order to increase the turbine overall power production efficiency and, therefore, it is desirable to increase the service time or reliability of pitch actuators.

U.S. Pat. No. 4,161,658 discloses a wind turbine having a wind driven rotor with a plurality of variable pitch angle blades. The blade angle is scheduled during acceleration and deceleration of the wind turbine by open loop controls to minimize stresses, and is scheduled during powered operation by closed loop controls to maintain desired torque or speed. The closed loop controls contain an integrator which produces an integral blade angle control signal. The scheduled blade angle is fed back to the integrators through an integrator tracking network to maintain the integral blade angle control signal at all times within a preselected range relative to the scheduled blade angle.

Whereas U.S. Pat. No. 4,161,658 discloses pitch control for minimising stresses, U.S. Pat. No. 4,161,658 neither discloses increased service time or reliability of the pitch actuators nor actuation of the pitch actuator as a problem. Accordingly, an improved control system capable alleviating the problem of reduced lifetime of pitch actuators due to actuation of the pitch actuator would be desirable.

SUMMARY OF THE INVENTION

Accordingly, the invention preferably seeks to alleviate or eliminate problems of reduced life time of pitch actuators, risk of wind-turbine pitch-actuator failures, and reduced operational reliability of wind turbines due to actuation of pitch actuators. Therefore, it may be seen as an object of the present invention to provide a control system capable of reducing wear of pitch actuators and the driving system for the pitch actuators.

This object and several other objects are obtained in a first aspect of the invention by providing a control-system for controlling rotor speed of a wind turbine, the wind turbine comprising a rotor and a pitch actuator for adjusting a pitch of a blade of the rotor, the control-system comprising:
  a control unit for generating a pitch control signal for the pitch actuator, the control unit comprising a gain of a speed error, where the speed error represents a difference between a reference speed of the rotor and a measured rotor speed,
  an error gain schedule for generating a modified magnitude of the speed error or a modified magnitude of the gain in dependence of the speed error, where the gain schedule increases for increasing magnitudes of the speed error, at least for some magnitudes of the speed error.

The invention is particularly, but not exclusively, advantageous for reducing operational induced wear of pitch actuators and the pitch system comprising mounts, bearings and electric and hydraulic actuator driving components.

It may be advantageous to provide an error gain schedule for modifying the magnitude of the speed error in dependence of the rotor speed error since such modification may enable error gain scheduling with zero gain or small gain for small or insignificant speed errors and larger gain for larger or significant speed errors. Thus, an error gain schedule having a gain which increases for increasing values of the speed error, at least locally for some values of the speed error, may have the advantage of reducing the control action, i.e. amplitudes and frequency of the pitch actuator's motion, since reducing the gain for some values of speed error may also reduce the magnitudes of the pitch control signal supplied to the pitch actuator. Reduced actuation of the pitch actuator may imply reduced wear and increased service life of the pitch actuator.

Small and insignificant speed errors may be understood as speed errors which does not require a control action or only requires a reduced control action for reducing the speed error by bringing the actual rotor speed closer to the desired reference rotor speed. Consequently, larger or significant rotor speed errors may be understood as speed errors which require a stronger control action in order to bring the actual rotor speed closer to the desired reference speed, for example in order to reduce the load on wind turbine blades or for reducing the amount of produced electric power. Another example could be during a grid fault, during which, a large reduction of power is required.

A magnitude, or equivalently a value or a size, of the speed error should be understood broadly to comprise a magnitude or value of an instant sample of the speed error, a magnitude or value of a time-average of samples of the speed error, a magnitude or value of a filtered speed error.

It may be another advantage to use gain schedule, since reduced control action facilitates other control actions. For example, when the rotor speed controller does not focus on minimising rotor speed error, the control system or some other controller can be used to minimise structural oscillations, e.g. oscillations of the tower of the wind turbine, by controlling the pitch for the purpose of reducing tower oscillations.

In an embodiment the error gain schedule being a function of speed error is multiplied with the speed error for generating a modified magnitude of the speed error. Multiplying the rotor speed error with the error gain schedule may improve the control system with respect to reducing wear of pitch actuators.

In an embodiment the error gain schedule adjusts the magnitude of the gain as a function of the speed error for generating a modified magnitude of the speed error. Adjusting the existing gain—e.g. a constant gain or gain being a function of other parameters such as wind velocity—as a function of speed error may be an efficient way of improving the control system.

In an embodiment the slope of the gain schedule gradually increases for increasing magnitudes of the speed error, at least for a first range of magnitudes of the speed error, and the slope of the gain schedule subsequently gradually decreases for a second range of values of the speed error, where the magnitude of values of the second range are greater than the magnitude of values of the first range. This embodiment may comprise an advantageous way of implementing a non-linear or piece-wise-linear gain schedule function which has a relative low gain for relative small speed errors and relative large gain for relative large speed errors so as to achieve a control system which on one hand reduces wear of pitch actuators and on the other hand is capable of reducing critical rotor speed errors.

In an embodiment the error gain schedule is represented by a linear or a non-linear function of the speed error. The gain schedule may, as an example, be represented as a table of gain values or an equation giving gain values as a function of speed errors.

In an embodiment operation of the control unit is selectable in dependence of measured wind speed so that the function of the error gain schedule is selected in dependence of the measured wind speed. It may be an advantage that the error gain schedule may be used for improving control systems with respect to pitch actuation where the control unit is selectable.

In an embodiment the control-unit comprises a control law for tracking the reference speed of the rotor, where the control law may comprise proportional-integral controller, a proportional-integral-differential controller or other suited control schemes. The error gain schedule control system may advantageously be combined with control laws for improving problems of pitch actuation, such as actuation induced wear.

In an embodiment the gain G comprises a pitch gain schedule for linearising a response of the wind turbine to the pitch control signal. It may be advantageous to linearise the response of the wind turbine, i.e. the relationship between rotor speed and pitch angle, in order to achieve a more linear response of the control system and, thereby, improved tracking of a speed reference.

In an embodiment the gain is dependent on at least one parameter selected from the list comprising: measured wind velocity, measured power generated by the wind turbine and measured pitch angle. Utilisation of a gain which is not a scalar gain but dependent on various parameters may be advantageous for achieving an improved controller.

In a second aspect the invention relates to a pitch-actuator system for a wind turbine, the wind turbine comprising a rotor with at least one blade and the pitch actuator system comprising a control-system according to claim 1 and a pitch actuator connectable to the control system for adjusting a pitch of the blade.

In a third aspect the invention relates to a wind turbine comprising a rotor with a least one blade, a pitch actuator for adjusting a pitch of the blade and the control-system according to claim 1 connectable with the pitch actuator for controlling rotor speed of the rotor.

In a fourth aspect the invention relates to a method for controlling rotor speed of a wind turbine comprising a rotor and a pitch actuator for adjusting a pitch of a blade of the rotor, the method comprising:

generating a pitch control signal for the pitch actuator by applying a gain to a speed error, where the speed error represents a difference between a reference speed of the rotor and a measured rotor speed, generating a modified magnitude of the speed error or a modified magnitude of the gain by using an error gain schedule which increases the magnitude of the speed error or the gain in dependence of the speed error, where an increasing speed error increases the magnitude of the gain schedule at least for some magnitudes of the speed error.

The fourth aspect may be combined with methods:

where the error gain schedule, being a function of speed error, is multiplied with the speed error for generating a modified magnitude of the speed error;

where the error gain schedule adjusts the magnitude of the gain as a function of the speed error for generating a modified magnitude of the speed error;

where the slope of the gain schedule increases for increasing magnitudes of the speed error, at least for a first range of magnitudes of the speed error, and where the slope of the gain schedule subsequently decreases for a second range of magnitudes of the speed error, where the magnitude of the second range are greater than the magnitude of the first range;

where the error gain schedule is represented by a linear or a non-linear function of the speed error;

where operation of the control unit is selected in dependence of measured wind speed;

where a control law is used for tracking the reference speed of the rotor;

where a pitch gain schedule is used for linearising a response of the wind turbine to the pitch control signal.

In an embodiment the method for controlling rotor speed of a wind turbine according to the fourth aspect, is a method for decreasing wear of the pitch actuator.

In a fifth aspect the invention relates to use of a control-system according to the first aspect for decreasing wear of the pitch actuator of the wind turbine.

The first, second, third, fourth and fifth aspect of the present invention may each be combined with any of the other aspects. These and other aspects of the invention will be apparent from and elucidated with reference to the embodiment described hereinafter.

Thus, in summary the invention relates a wind turbine control system suitable for minimising actuation of pitch actuators. The control system uses an error gain schedule in full load control for reducing pitch actuation when the difference between the rotor speed and the reference rotor speed is not critical for the load of wind turbine components. The error gain schedule may be a nonlinear function which reduces the gain for low rotor speed errors. The use of the error gain schedule may reduce wear of the pitch actuators and may improve reduction of structural oscillations since focus removed from tracking the rotor speed reference when the speed error is low.

BRIEF DESCRIPTION OF THE FIGURES

The present invention will now be explained, by way of example only, with reference to the accompanying Figures, where.

DESCRIPTION OF AN EMBODIMENT

Figure 1:
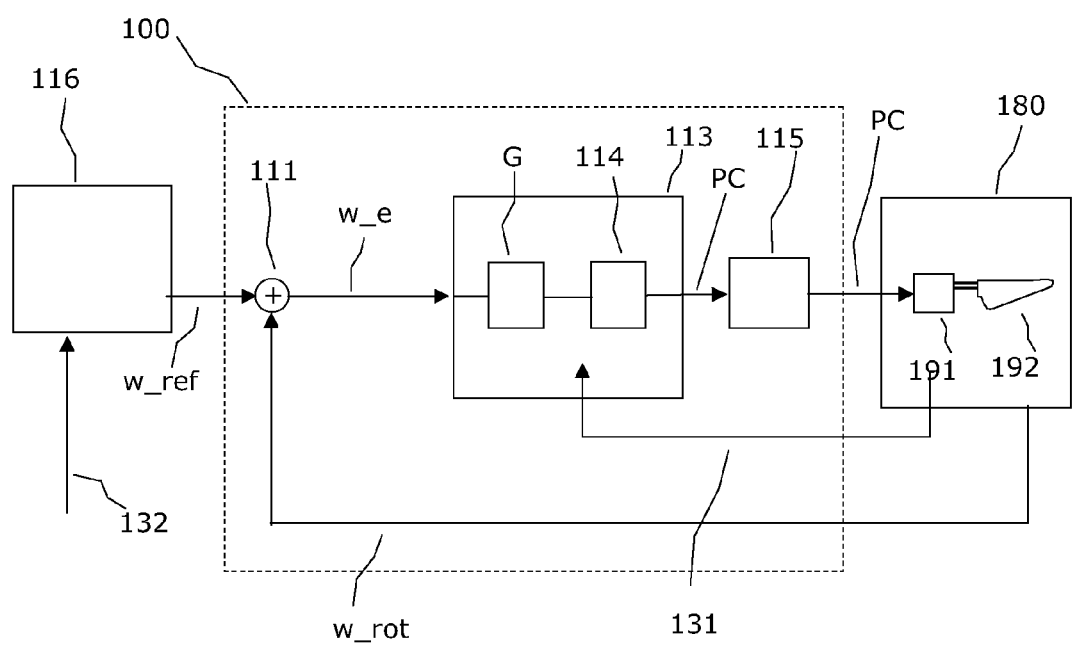
FIG. 1 shows a known control system for controlling the rotor speed of a wind turbine.

FIG. 1 shows a known control system 100 for controlling the rotor speed of a wind turbine. The wind turbine 180 comprises a rotor with at least one rotor blade 192. The rotor blade 192 is pitch adjustable. That is, the blade, or a part of the blade extending in a longitudinal direction of the blade, for example the tip of the blade, is angularly adjustable around the longitudinal axis of the blade. A pitch actuator 191 is used for performing the angular adjustment or pitch adjustment of the blade or blade-part.

Figure 2:
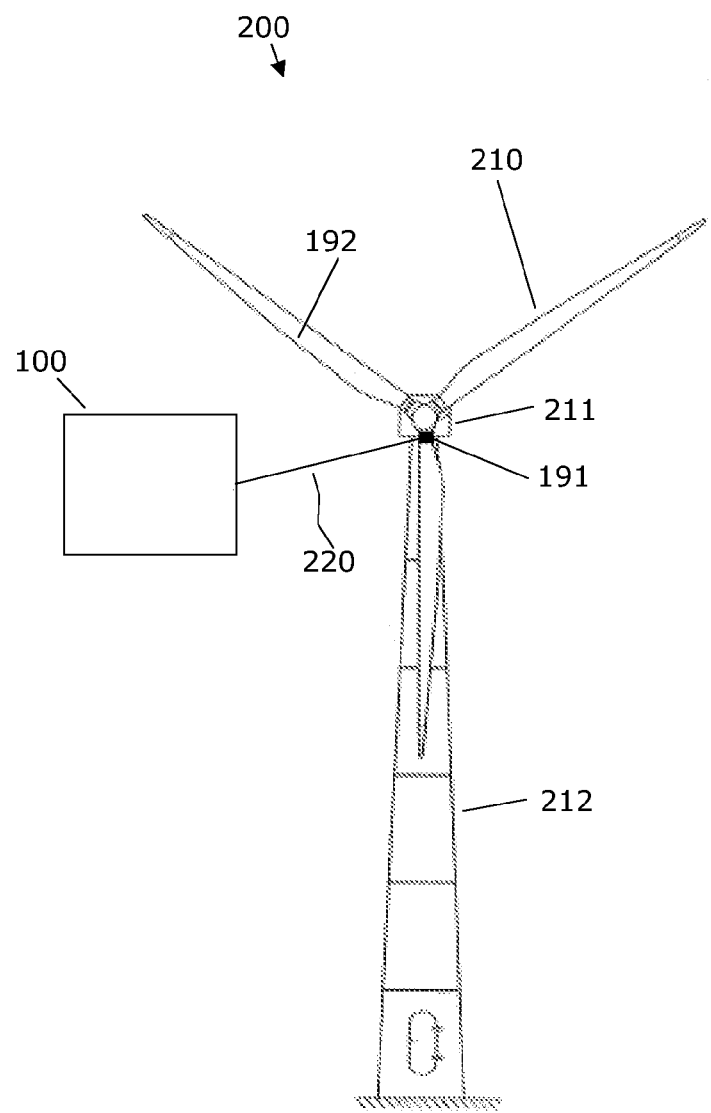
FIG. 2 shows a wind turbine with a control system.

FIG. 2 shows a wind turbine 200 comprising a rotor 210 for driving a shaft coupled to a power generator for generation of electric power from the wind driven rotor 210. The control system 100 may be housed outside the wind turbine, inside the nacelle 211, inside the tower 212 or elsewhere. The control system 100 supplies a pitch control signal PC, 220, for example an electrical signal, to the pitch actuator 191 or to a hydraulic drive system comprising a hydraulic pitch actuator 191.

The control system 100 in FIG. 1 generates a speed error or a speed difference w_e from the difference between a desired reference speed w_ref of the rotor 210 and a measured rotor speed w_rot. The speed error w_e may be generated by an error unit 111 which determines the difference between the reference w_ref and the measured speed w_rot. The difference between the reference w_ref and the measured speed should be understood broadly to include filtered differences where any of the speed_error, the measured rotor speed and the reference speed are filtered, averaged or otherwise processed. Thus, rotor speed error w_e representing the difference between the reference speed w_ref and the measured rotor speed w_ret should be understood broadly to comprise a sum of the reference speed and the measured speed, a mean or averaged sum or difference, a low-pass filtered sum or difference. It is understood that a sum may generate a difference when one of the rotor speed or measured speed has a negative value and the other a positive value. The error unit 111 may be comprised by a computer or processor for determining or deriving the speed difference or a digital or analogue electronic circuit for obtaining the speed difference.

The rotor speed w_rot and, correspondingly, the reference speed w_ref, may be the rotational speed of the rotor 210 or the rotational speed of the fast rotating axis generated by the gear box (not shown).

The control system 100 comprises a control unit 113 which comprises a gain G and possibly a control law 114. The control law 114 may by any suitable controller for example a Proportional (P) controller or a Proportional-Integral (PI) controller. Thus, the control law may be a mathematical equation or an algorithm processed by a computer or processor. The control law may also be implemented as an analogue or digital electronic circuit. It is understood that the control law acts to minimise the speed error w_e is a suitable way, for example by inclusion of an integral term for minimising an otherwise consistent speed error by time integration of the speed error. Equivalently, it the control law acts to track the reference rotor speed w_ref.

It should be understood that even though the error unit 111 is illustrated as a separate unit, the error unit may for example be comprised by an algorithm of the control law 114.

The gain G modifies the speed error w_e in order to increase or decrease the speed error w_e so as to achieve a respective faster or slower control of the speed error w_e, i.e. faster or slower minimisation of the speed error w_e. The gain G of the speed error w_e may be a gain factor or gain function which is multiplied with the speed error w_e to obtain a modified speed error w_e.

In the case where the control law 114 includes a proportional part, e.g. a PI controller, then the gain G and the proportional part (P) of the control law may be combined into a single gain factor G or a the single proportional part (P).

The control unit 113 generates a pitch control signal PC which is supplied to the pitch actuator 191. The pitch control signal either acts directly on the pitch actuator to generate a rotation of the actuator and the blade, or the pitch control signal may act indirectly via a pitch driver (not shown) which may amplify the control signal PC into a drive signal which acts on the pitch actuator. The control signal PC may be further processed by a pitch processing device 115, for example pitch servo, before the processed pitch control signal is supplied to the pitch actuator or a pitch driver. The pitch servo 115 may be supplied with a pitch feedback signal form the pitch actuator. The single control unit 113 or e.g. three control units 113 may generate e.g. three control signals PC, one for each of three pitch actuators 191 coupled to three blades 192.

The measured rotor speed w_rot used for calculating the speed error w_e, is obtained from a speed sensor (not shown), e.g. a tachometer coupled to the rotor shaft. The measured rotor speed may be transmitted to the error unit 111 or equivalently to a computer or processor for determining the speed error w_e.

The reference speed of the rotor w_ref may be generated by a reference generator 116, for example in dependence of a measured or estimated wind velocity 132 supplied to the reference generator 116.

The overall system comprising the control-system 100, the sensors and actuators 191 of the wind turbine 180 and the reference generator 116 may be configured in various ways and, therefore, the control scheme depicted in FIG. 1 is only one particular configuration among other functionally equivalent control schemes. For example, the control unit 113 may be supplied with other inputs than the speed error w_e. Thus, the control unit 113 may be supplied with a measured parameter 131 of the power generated by the wind turbine and a reference parameter of a desired power generation of the wind turbine in order to determine a power error (not shown) of the difference between the desired power reference and the measured parameter 131. The power error can be utilised by another control law for control of the wind turbine's generated power by generation of a converter control signal supplied to the turbine's electrical power converter.

The wind turbine 180 may be operated in dependence of the available wind energy, i.e. in dependence of wind velocity. Thus, in order to operate the wind turbine most efficiently and generate a maximum amount of electric power from the wind energy when the wind velocity is relatively low, the pitch of the blades 192 may be controlled to maximise electric power generation whereas the rotor speed w_rot and the power generation may be controlled, not by controlling the pitch, but by controlling the electric power converter so that the generator coupled to the rotor via the shaft ensures that the measured rotor speed w_rot and/or the generated power is equal to or approaches the desired rotor speed and/or generated power. At relative high wind velocities, the wind turbine may be operated by controlling the pitch of the blades to avoid that the rotor speed w_rot becomes too high, which would otherwise cause too high mechanical loads. Thus, at relative low wind speeds the pitch is typically set to relative low angles, whereas as the pitch is set to relative high angles at relative high wind speeds to reduce the aerodynamic efficiency of the blades and, thereby, the rotor speed w_rot. In order to control the wind turbine in dependence of relative low and relative high wind turbines, the control-system may have both a full load controller 113,313 and a partial load controller 312 as shown in FIG. 3.

Figure 3:
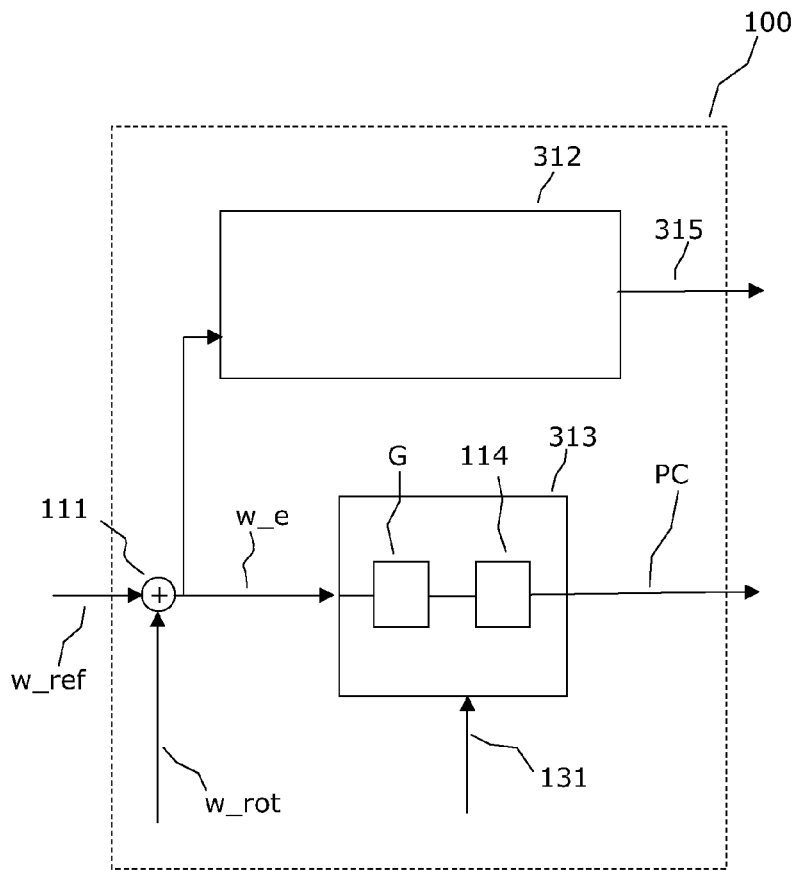
FIG. 3 shows a known control system comprising both a full load controller and a partial load controller.

FIG. 3 shows a known control-system 100 comprising both a full load controller 313 and a partial load controller 312. The depicted full load controller 313 has a similar function as the controller 113 of FIG. 1. The partial load controller 312 may receive the rotor speed error w_e and possible a power demand parameter (not shown). The partial load controller generates a power control signal in the form of a generator reaction torque signal which is transmitted to the electric power converter. The control system 100 may be configured to shift from partial load control to full load control when the energy content of the wind passes a given threshold. Accordingly, the operation of the control unit 113, 312, 313 is selectable in dependence of a measured or estimated energy content of the wind, which as an example may be determined in terms of wind velocity and generated power.

Figure 4A:
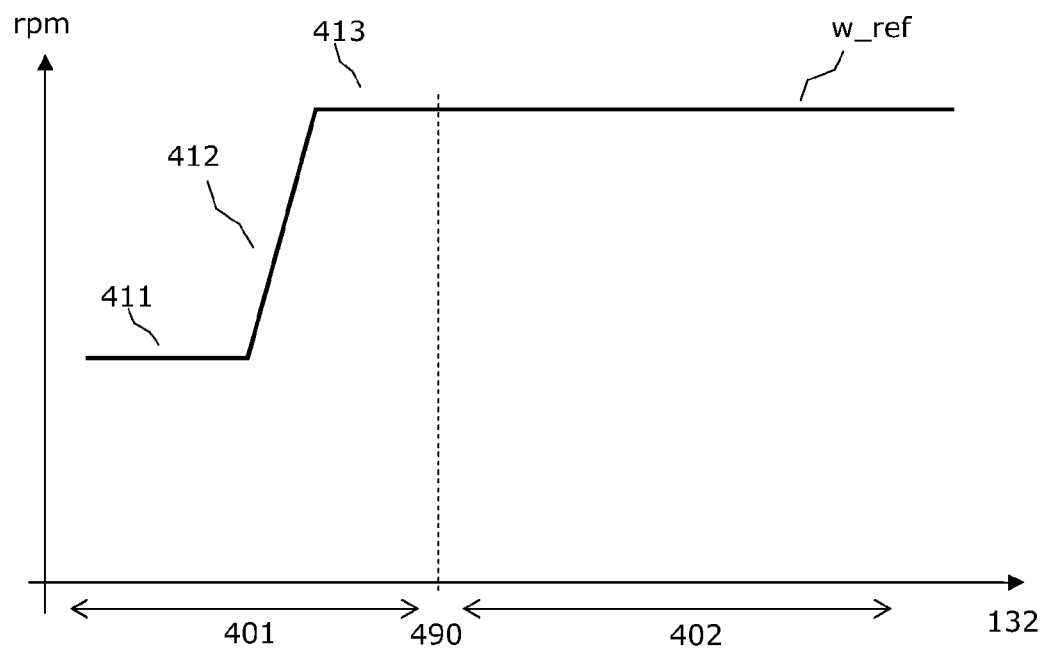
FIG. 4A illustrates a rotor speed reference for the control system.

FIG. 4A illustrates the rotor speed reference w_ref (in rotations per minute, rpm) as a function of wind velocity 132. The region of partial load control 401 comprises a region 411 where the value of the speed reference w_ref is low, a region 412 where the speed reference w_ref increases, and a region 413 where the speed reference w_ref is equal to the rated rotor speed of the wind turbine. The shift from the partial load region 401 to the full load region 402 may be determined from the energy content of the wind, or alternatively from measures of the wind speed 132, the generated power 131 or a combination thereof. For example, the shift may be performed when the estimated energy content of the wind approaches or passes a wind-energy threshold, principally illustrated by reference 490.

Figure 4B:
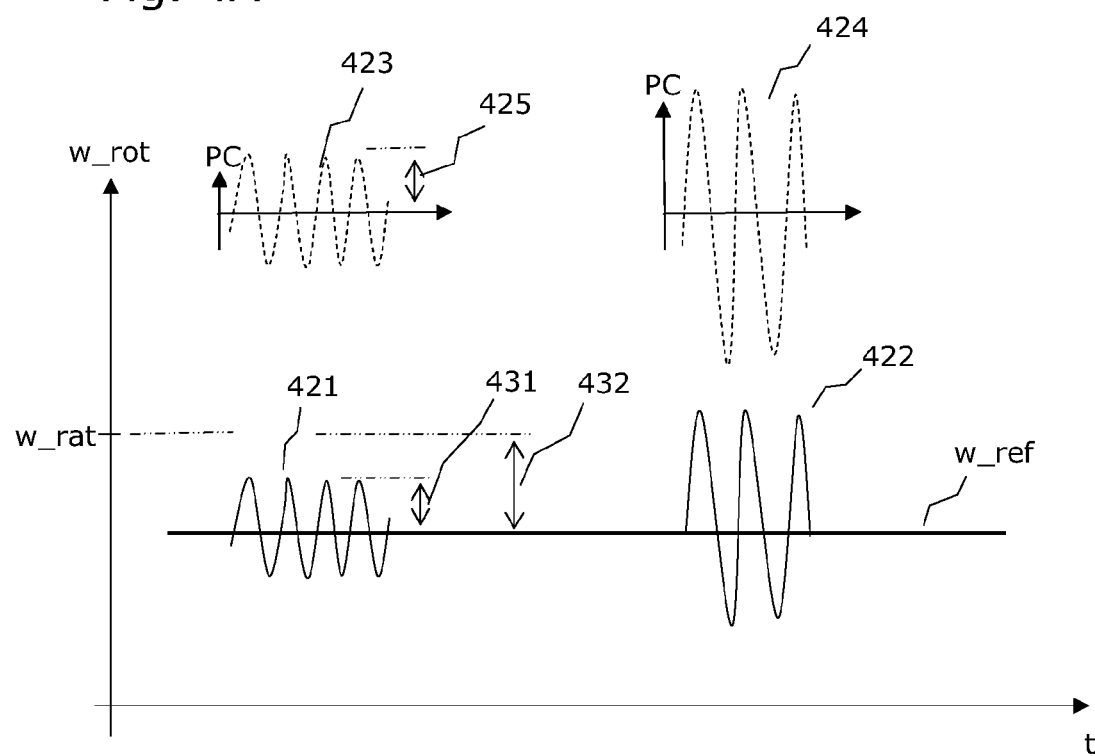
FIG. 4B shows rotor speed variations relative to speed reference and corresponding control signal variations.

FIG. 4B shows variations of the measured rotor speed w_rot in the form of curve 421 with relative small variations and curve 422 with relative large variations. The variations 421 and 422 are shown in relation to the rotor speed reference 422, but with an exaggerated amplitude of variations as compared with the reference speed w_ref.

The variation of rotor speed 421 and 422 is caused by the control-unit 113,313 in its attempt to track the rotor reference speed w_ref by generation of a pitch control signal PC. The curves 423 and 424 illustrate variations in the pitch control signal PC generated by the control unit 113,313 in response to the rotor speed error w_e, i.e. the difference between the respective rotor speed variations 421 and 422 and the reference w_ref.

The pitch control signal variations 423, 424 cause corresponding actuation of the pitch actuator 191. Actuation of the hydraulic or electric pitch actuator 191 causes wear and shortened lifetime of the actuator itself as well as other components of the wind turbine including blade bearings and the hydraulic system of the pitch actuators 191.

Accordingly, it is desirable to reduce the amplitude of the pitch control signal variations 423, 424.

On the other hand, if the rotor speed reference w_ref is not tracked efficiently, so that a large speed difference w_e is allowed, components of the wind turbine are also exposed to additional wear and shortened lifetime if the rotor speed w_rot becomes too large. Too high values of rotor speed w_rot cause shortened lifetime and wear of turbine blades 192, the tower 212, the electric power converter and other components.

By properly adapting the action of the control-unit 113,313 in dependence of the rotor speed error w_e it is possible to limit the amplitude of the pitch control signal variation 423 when the amplitude 431 of the rotor speed variations 421 and, thereby, the amplitude 431 of the rotor speed error w_e is below a given error threshold 432—or equivalently, it is possible to limit the amplitude of the pitch control signal variation 423, for example when a peak value or an average value of the rotor speed w_rot is below a given rated speed w_rat as illustrated in FIG. 4B.

Since the turbine blades 192, the tower 212, the electric power converter and other components of the wind turbine are designed to be operated at speeds up to the rated speed w_rat, the lifetime of these components are substantially not reduced more than at other rotor speeds below the rated speed. Therefore, when the rotor speed w_rot is below a given rotor speed threshold w_rat or when the speed error w_e, 431 is below a given error threshold 432, the amplitude 425 of the pitch control signal PC—and thereby the amplitude of the actuation of the pitch actuator 191—can be reduced without exposing components of the wind turbine to additional wear or shortened lifetime. Clearly, when the amplitude 425 of the pitch control signal PC is reduced, the wear of the pitch actuator 191, pitch bearings and hydraulic or electric pitch-driving systems is reduced and, correspondingly, the lifetime is increased.

The amplitude 425 of the pitch control signal PC can be reduced in dependence of the speed error w_e or rotor speed w_rot—i.e. in dependence of the rotor speed w_rot or speed error w_e relative to the respective rotor speed threshold w_rat or the error threshold 432—by functionally modifying the control system 100 or by augmenting the control system 100 with an error gain schedule for generating a modified magnitude of the speed error w_e or a modified magnitude of the gain G. The function of the modification of the control system 100 or the error gain schedule is to increase the magnitude of the speed error w_e or the gain G for increasing values of the speed error w_e, at least for some magnitudes of the speed error w_e. The effect of the modification of the speed error or the gain G is that the speed error is amplified relative more for large values of supplied speed errors w_e as compared to smaller values of supplied speed errors w_e.

Figure 5A:
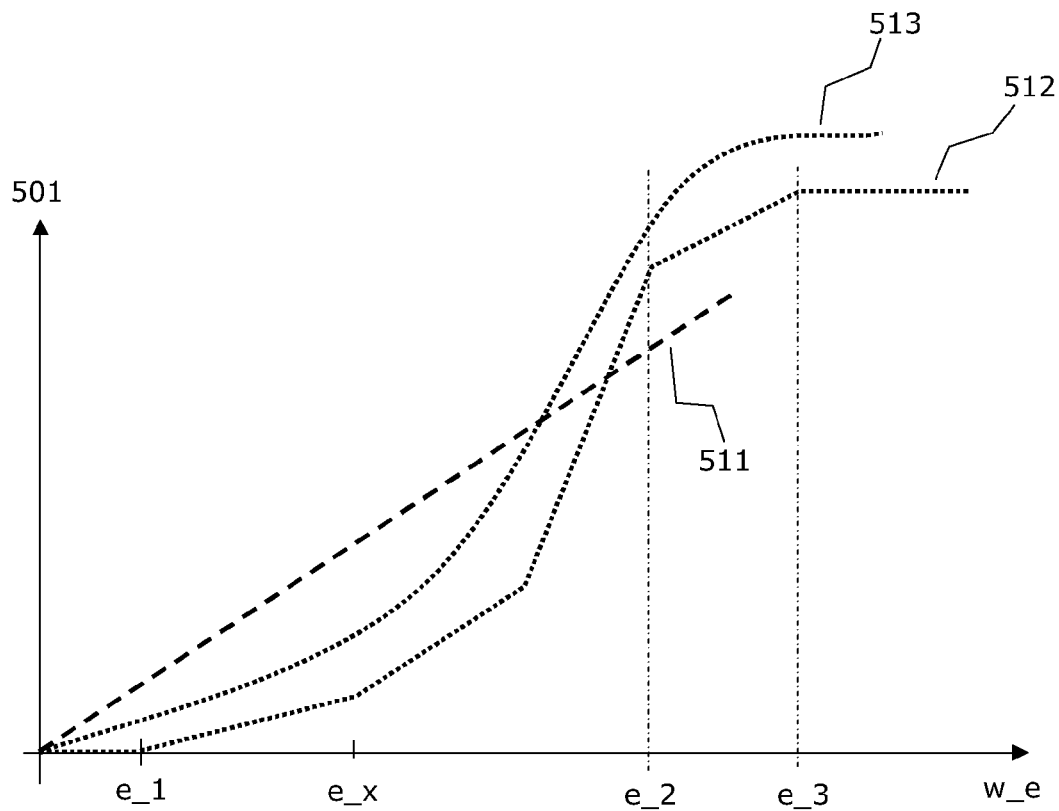
FIG. 5A shows examples of different error gain schedules.

FIG. 5A shows examples of different gain schedules which increase the magnitude of the speed error w_e or the gain G as a function of increasing speed error w_e. Gain schedule 511 increases linearly for increasing speed error w_e. Gain schedule 512, which is piece-wise linear, has a positive slope within the range e_1-e_3, and has increasing slopes for speed errors w_e within the range e_1-e_2. Gain schedule 513 increases non-linearly with increasing speed error, at least for some magnitudes of the speed error, i.e. the gain schedule may have a portion with zero-slope for speed errors greater than e_3.

In general the gain schedules 512-513 may have a positive slope which increases for increasing values of the speed error, at least for a first range of values of the speed error between e_1 and e_2, and where the slope of the gain schedule subsequently decreases for a second range of values of the speed error between e_2 and e_3, where the magnitude of error values of the second range are greater than the magnitude of values of the first range.

Figure 5B:
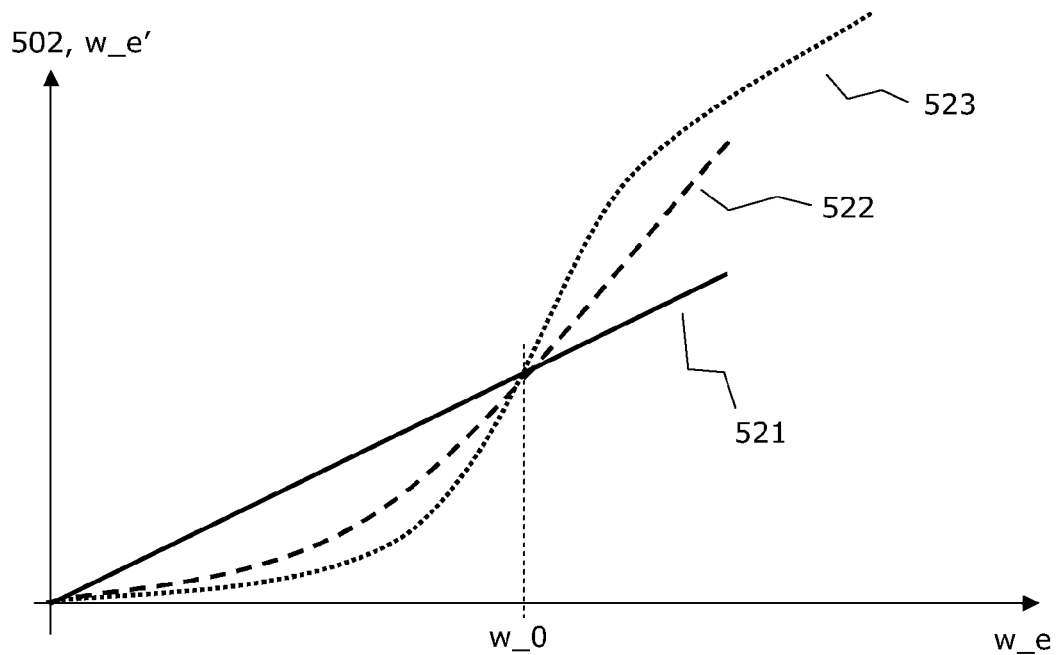
FIG. 5B shows modified speed errors due to the error gain schedules.

FIG. 5B shows examples of modified speed errors w_e' (see FIG. 6A-B) as a function of speed error w_e. Curve 521 shows the modified speed error w_e'=G×w_e of the control unit 113 of FIG. 1 or control unit 313 of FIG. 3, where the speed error w_e is simply multiplied with the scalar gain G. Thus, the error curve 521 is linear with a slope of G. Error curve 522 shows the modified speed error w_e'=G×w_e× f_lin, where f_lin represent the linear gain schedule curve 511 of FIG. 5A. Error curve 523 shows the modified speed error w_e'=G×w_e×f_nlin, where f_nlin represents the non-linear gain schedule curve 513 of FIG. 5B.

Comparing the error curves 522 and 523 with the traditional error curve 521 shows that, for speed errors below a given value w_0, the gain schedule modified speed errors w_e' have smaller magnitudes than the speed errors of the traditional control system 100 of FIG. 1 and FIG. 3 and, therefore, the amplitudes 431 of the speed error variations 421 and, consequently, the amplitudes 425 of the pitch control signal PC, 423 and the pitch actuation amplitudes are lowered when the error gain schedule 511-513 is utilised as compared to the traditional controller 113 without error gain scheduling. The positive effect of reducing the amplitudes 425 of the pitch control signal PC is increased lifetime of the pitch actuation system comprising pitch actuators, bearings and hydraulic or electric drive systems.

Above the rotor speed error w__0, the gain schedule modified speed errors w_e' may have larger magnitudes than the speed errors w_e of the traditional control system 100. Accordingly, above the speed error w__0, the amplitudes of the pitch control signal variations 424 may be larger when the error gain schedule is utilised as compared to control signal variations 424 when no gain schedule is utilised. Since the rotor error speed w_e only seldom increases beyond the differentiating speed error w__0, e.g. under very turbulent wind conditions, the increased wear of the pitch actuation system due to the error gain schedule for large rotor speed errors w_e is very low as compared to the decreased wear under typical and dominating wind conditions where the rotor speed errors are mostly below w__0.

In fact the additional gain of the rotor speed error w_e for speed errors above w__0 may result in faster reduction of the speed error w_e, so that the additional load of e.g. wind turbine blades due to a wind gust may reduced faster since the control system 100 acts faster.

Clearly, it is also possible to design the error gain schedule 513 so that values of the gain scheduled error curve 523 does not exceed values of the traditional speed error curve 521 for the traditional control system of FIG. 1 for speed errors above w__0. Accordingly, the form of the gain schedules 511-513 and the location of the differentiating speed error w__0 is variable and may be designed dependent on wind turbine dynamics.

In addition to reducing the amplitudes 425 of the pitch control signal PC, 423, the gain schedules 511-513 may also reduce the frequency of the pitch control signal variations 423. Clearly, an reduced frequency of actuations of the pitch controller 191 is a desirable effect of using the error gain schedules 511-513, since a reduced frequency also reduces wear of the pitch actuator 191 and the pitch system.

The error gain schedule 511-513 may be implemented by various means having the same of equivalent functions.

Figure 6A:
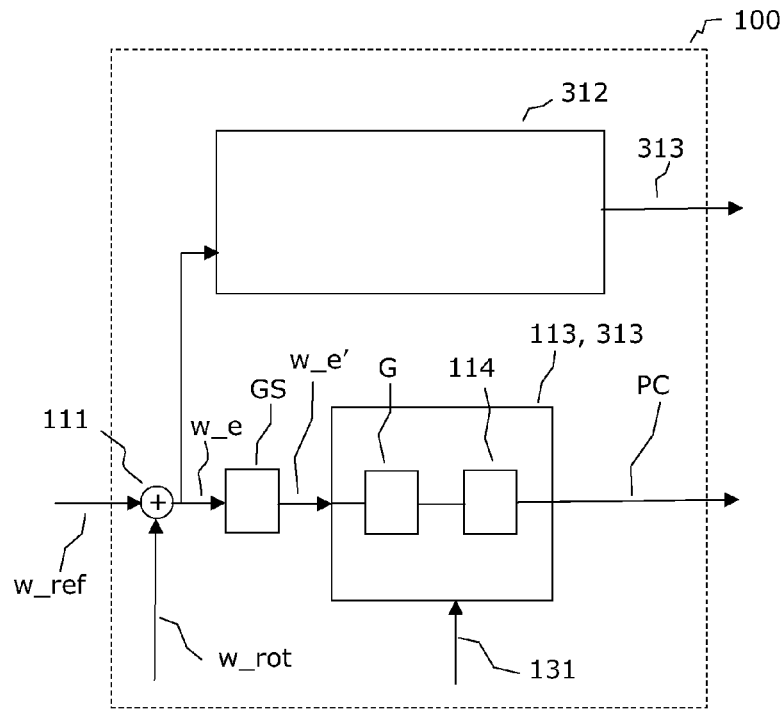
FIG. 6A-B shows how the error gain schedule may be implemented.

FIG. 6A shows how the error gain schedule 511-513 may be implemented as a gain schedule GS in series with the gain G of the control-unit 113,313. In this embodiment the gain schedule may be implemented as a linear or non-linear function GS(w_e) of the speed error w_e which generates a modified speed error w_e' which is supplied the to gain G.

Figure 6B:
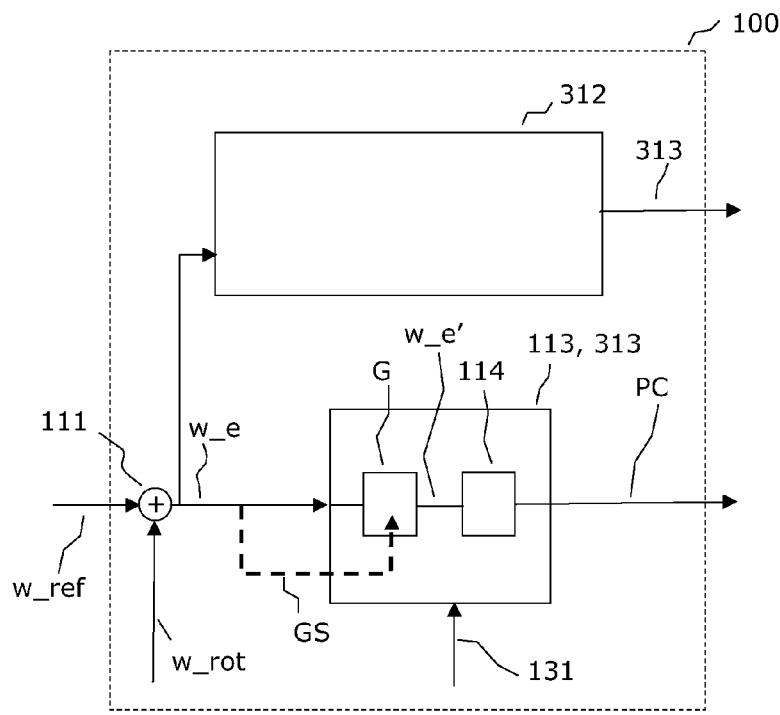

FIG. 6B shows how the error gain schedule 511-513 may be implemented as a gain schedule GS which modifies the amplification of the existing gain G by adjusting the magnitude of the gain (G) as a function of the speed error (w_e) (illustrated by the dashed adjustment arrow GS). In this embodiment the gain schedule 511-513 may be implemented as a linear or non-linear gain function G(w_e) of the speed error w_e which generates a modified speed error w_e' being modified both according to the gain G and the gain schedule GS.

The error gain schedules 511-513, GS may be implemented in various ways, e.g. by multiplying the speed error w_e with the gain schedule GS or modifying the gain G according to the gain schedule GS so as to effectively multiply the speed error w_e with the gain schedule GS. Irrespective of how the gain schedule GS is implemented, the gain schedule GS serves to modify the speed error w_e by increasing the magnitude of the speed error w_e, the gain G, or generally increasing the magnitude of the gain schedule GS as a function of the speed error w_e at least for some magnitudes of the speed error w_e.

The application of a gain schedule applies both to the embodiment of FIG. 1 with a single control-unit 113 and the embodiment of FIG. 3 with a separate control unit 312.

Since the application of the gain schedule GS reduces amplitudes of the pitch control signal PC and, thereby, the amplitudes of pitch adjustments of the pitch actuator 191 and, as a result, reduces wear of the pitch actuator 191, the gain schedule GS can be applied as a method for reducing amplitudes of pitch adjustments of the pitch actuator 191 or as a method for decreasing wear of the pitch actuator 191 and the pitch system.

The effect of pitch adjustment of a blade on a change of rotor speed w_rot, i.e. the effect of rotating the blade some angle, is non-linear in the sense that the effect of a given rotation, e.g. 1°, at a small pitch angle θ is less than the effect of the same rotation at a large pitch angle. The wind turbine is typically operated at a small pitch angle, e.g. a relative pitch of 0°, during partial load 401, whereas the pitch for increasing wind speed in the full load region 402 is increased up to e.g. a relative pitch of 20°. Thus, the pitch system is more sensitive at a large pitch angle than a small pitch angle.

The sequence of the error gain schedule GS, the gain G and the control low 114 in the control system 100 is arbitrary; for example the gain schedule GS may be placed after the control law 114.

Figure 7A:
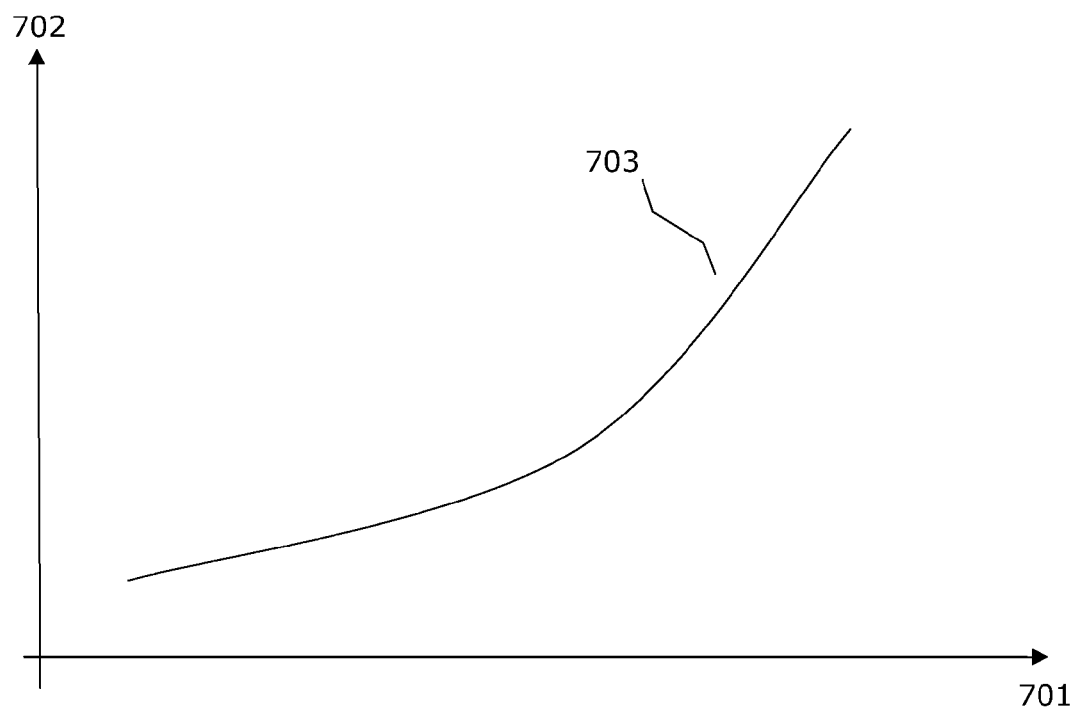
FIG. 7A shows the non-linear rotor speed response to pitch variations.

FIG. 7A shows a principal sketch of a rotor speed variation 702 as a non-linear function 703 of pitch angle 701. Since the pitch may be equivalent to wind velocity, the coordinate 701 may also represent the wind velocity 132.

In order to compensate for the non-linear pitch function 703, the gain G can be made dependent on the pitch or wind velocity 701 so that the gain G is relative larger for small values of pitch or wind velocity 701 as compared to large values of pitch or wind velocity 701.

Figure 7B:
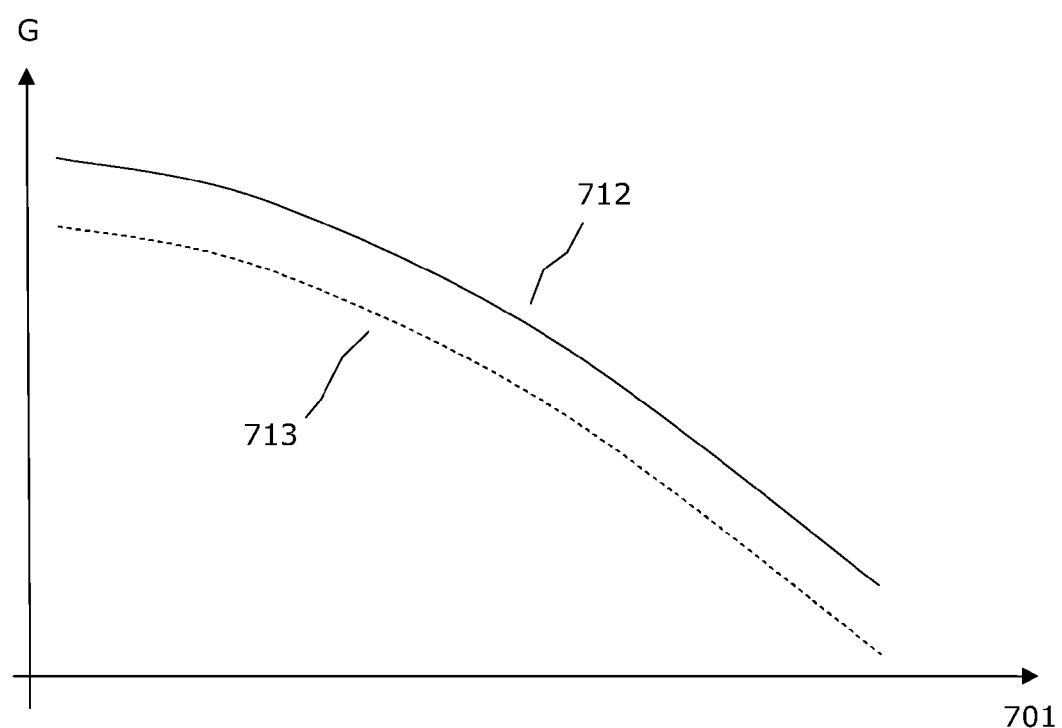
FIG. 7B shows pitch gain schedules for compensating for the non-linear rotor speed response to pitch variations.

FIG. 7B shows a principal sketch of a pitch gain schedule 712 for linearising the response 703 of the wind turbine to the pitch control signal PC. The response of the wind turbine may be rotor speed 702, or consequently the generated power or rotor torque. Thus, the pitch gain schedule 712 exhibits a relative large gain G for small values of pitch or wind velocity 701 and a relative small gain G for large values of pitch or wind velocity 7 so as to compensate for or linearise the non-linear pitch function 703. Use a gain G comprising a pitch gain schedule 712 implies that the functional relationship between speed error w_e and the change of rotor speed w_rot is linear, or at least more linear as compared to use a scalar gain G.

When the gain G comprises a pitch gain schedule 712 which is dependent on measured pitch angle 701, measured wind velocity 132 and/or generated power 131, the gain G equally depends on those parameters. Accordingly, the gain G may be provided with inputs for measured pitch angle 701, measured wind velocity 132 and/or generated power 131.

The gain schedule GS may modify the gain G comprising the pitch gain schedule 712 similar to modifying the scalar gain G as depicted in FIG. 6B. Thus, the error gain schedule 511-513 may be implemented as a gain schedule GS which modifies (illustrated by the dashed adjustment arrow GS in FIG. 6B) the amplification of the gain comprising the pitch gain schedule 712. The modification of the pitch gain schedule 712 may be accomplished by shifting the pitch gain 712 to the gain-modified pitch gain 713 having lover overall gain when the speed error w_e is below a given error e_x as shown in FIG. 5A or generally by shifting the pitch gain 712 according to the gain schedule GS so that the pitch gain 712 is shifted an amount given by the magnitude of the gain schedule GS. It may be beneficial to use the error gain schedule GS in combination with the pitch gain schedule 712, since use of the pitch gain schedule 712 implies the that the control system works efficiently for a large range of wind velocities as compared to use of a scalar gain G.

The control system 100 comprising the control unit 313, the gain schedule GS and the error unit 111 may be implemented as a computer program adapted to be processed on a computer or a digital processor. The processing of the computer program may be carried out by a single computer or distributed over a number of computers. The gain schedule function GS may be implemented in the control system 100 as a mathematical equation to be solved by the computer or the gain schedule may be stored in the computer as a table of gain schedule values for different speed error values.

Figure 8:
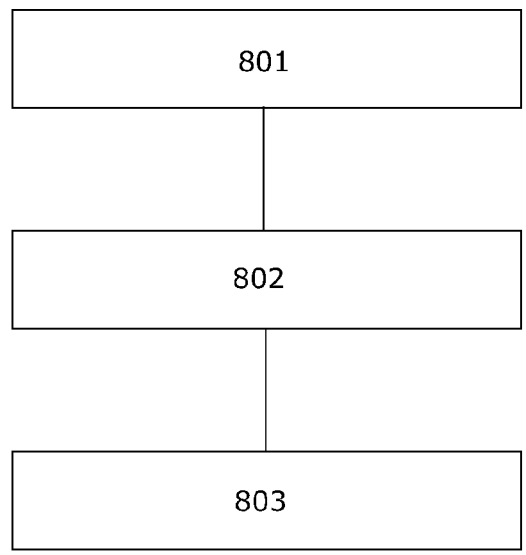
FIG. 8 is a flowchart of a method according to the invention.

FIG. 8 illustrates steps of the method. Step 801 comprises generating a modified magnitude of the speed error w_e or a modified magnitude of the gain G by using an error gain schedule GS. Step 802 comprises generating a pitch control signal PC for the pitch actuator by applying a gain G to a speed error w_e. Step 803 comprises supplying the pitch control signal PC to the pitch actuator 191.

The invention claimed is:

1. A control arrangement for controlling a rotor speed of a rotor of a wind turbine, the wind turbine further comprising a pitch actuator for adjusting a pitch of a blade of the rotor, the control arrangement comprising:
    a gain component configured to receive a speed error signal and to generate a modified speed error signal, wherein the speed error signal is based on a difference between a reference rotor speed and a measured rotor speed; and
    a gain schedule component coupled with the gain component and configured to influence the generation of the modified speed error signal using an error gain schedule that is based on a magnitude of the received speed error signal,
    wherein for at least a portion of the error gain schedule corresponding to a first range of magnitudes of the speed error signal, a slope of values of the error gain schedule increases along with increasing magnitudes of the speed error signal, and
    wherein the control arrangement produces a pitch control signal for the pitch actuator that is based on the generated modified speed error signal.

2. The control arrangement of claim 1, wherein the values of the error gain schedule are a function of the magnitude of the received speed error signal, wherein a value of the error gain schedule is multiplied with the received speed error signal to generate a second speed error signal having a modified magnitude, and wherein the gain component is configured to receive the second speed error signal to generate the modified speed error signal.

3. The control arrangement of claim 1, where the gain schedule component is configured to select a magnitude of the gain component as a function of the received speed error signal to generate the modified speed error signal.

4. The control arrangement of claim 1, wherein for a second range of magnitudes of the speed error signal that is larger than the first range of magnitudes, the slope of values of the error gain schedule decreases along with increasing magnitudes of the speed error signal.

5. The control arrangement of claim 1, wherein the error gain schedule is represented by a linear or a non-linear function of the speed error signal.

6. The control arrangement of claim 1, wherein the error gain schedule is selectable based on a measured wind speed.

7. The control arrangement of claim 1, further comprising a controller component configured to track the reference rotor speed.

8. The control arrangement of claim 1, wherein the gain component includes a pitch gain schedule configured to linearize a response of the wind turbine to the pitch control signal.

9. The control arrangement of claim 1, wherein a gain applied by the gain component depends on at least one parameter selected from the list comprising: measured wind velocity, measured power generated by the wind turbine, and measured pitch angle.

10. A wind turbine comprising:
    a rotor including at least one blade;
    a pitch actuator for adjusting a pitch of the at least one blade; and
    the control arrangement of claim 1 operatively connected with the pitch actuator for controlling a rotor speed of the rotor.

11. A method for controlling rotor speed of a rotor of a wind turbine, the wind turbine further including a pitch actuator for adjusting a pitch of a blade of the rotor, the method comprising:
    receiving a speed error signal that reflects a difference between a measured rotor speed and a reference rotor speed;
    selecting, based on the magnitude of the received speed error signal, a value from an error gain schedule, wherein for at least a portion of the error gain schedule corresponding to a first range of magnitudes of the speed error signal, a slope of values of the error gain schedule increases along with increasing magnitudes of the speed error signal;
    generating a modified speed error signal based on the received speed error signal, the selected error gain schedule value, and a value of a gain component; and
    generating a pitch control signal for the pitch actuator based on the modified speed error signal.

12. The method of claim 11, where the generated pitch control signal is selected to decrease an amount of wear of the pitch actuator.

13. A pitch actuation arrangement for a rotor of a wind turbine, the pitch actuator arrangement comprising:
    a control arrangement that includes:
        a gain component configured to receive a speed error signal and to generate a modified speed error signal, wherein the speed error signal is based on a difference between a reference rotor speed and a measured rotor speed of the rotor, and
        a gain schedule component coupled with the gain component and configured to influence the generation of the modified speed error signal using an error gain schedule that is based on a magnitude of the received speed error signal,
        wherein for at least a portion of the error gain schedule corresponding to a first range of magnitudes of the speed error signal, a slope of values of the error gain schedule increases along with increasing magnitudes of the speed error signal; and
    a pitch actuator configured to adjust a pitch of a blade of the rotor based on a pitch control signal that is received from the control arrangement and based on the generated modified speed error signal.

14. The pitch actuation arrangement of claim 13, wherein the values of the error gain schedule are a function of the magnitude of the received speed error signal, wherein a value of the error gain schedule is multiplied with the received speed error signal to generate a second speed error signal having a modified magnitude, and wherein the gain component is configured to receive the second speed error signal to generate the modified speed error signal.

15. The pitch actuation arrangement of claim 13, where the gain schedule component is configured to select a magnitude of the gain component as a function of the received speed error signal to generate the modified speed error signal.

16. The pitch actuation arrangement of claim 13, wherein for a second range of magnitudes of the speed error signal that are larger than the first range of magnitudes, the slope of values of the error gain schedule decreases along with increasing magnitudes of the speed error signal.

17. The pitch actuation arrangement of claim 13, wherein the error gain schedule is represented by a linear or a non-linear function of the speed error signal.

18. The pitch actuation arrangement of claim 13, wherein the error gain schedule of the gain schedule component is selectable based on measured wind speed.

19. The pitch actuation arrangement of claim 15, where the control arrangement further includes a controller component configured to track the reference rotor speed.

* * * * *